United States Patent
McLoughlin et al.

(10) Patent No.: US 9,625,915 B2
(45) Date of Patent: Apr. 18, 2017

(54) COMPLETE INTEGRATED FIREGROUND CONTROL SYSTEM AND METHOD

(71) Applicant: ROM Acquisition Corporation, Belton, MO (US)

(72) Inventors: John E. McLoughlin, Hauppauge, NY (US); Neocles G. Athanasiades, E. Setauket, NY (US); Kiam Meng Toh, St. James, NY (US)

(73) Assignee: ROM Acquisition Corporation, Belton, MO (US)

( * ) Notice: Subject to any disclaimer, the term of this patent is extended or adjusted under 35 U.S.C. 154(b) by 587 days.

(21) Appl. No.: 13/895,857

(22) Filed: May 16, 2013

(65) Prior Publication Data

US 2013/0253711 A1    Sep. 26, 2013

Related U.S. Application Data

(63) Continuation-in-part of application No. 12/560,398, filed on Sep. 15, 2009, now Pat. No. 8,517,696.
(Continued)

(51) Int. Cl.
| | |
|---|---|
| *A62C 5/02* | (2006.01) |
| *A62C 27/00* | (2006.01) |
| *A62C 37/36* | (2006.01) |
| *G05D 7/06* | (2006.01) |
| *F04B 17/06* | (2006.01) |
| *F04B 49/08* | (2006.01) |
| *F04B 17/05* | (2006.01) |

(52) U.S. Cl.
CPC ........... *G05D 7/0617* (2013.01); *A62C 27/00* (2013.01); *A62C 37/36* (2013.01); *F04B 17/05* (2013.01); *F04B 17/06* (2013.01); *F04B 49/08* (2013.01); *A62C 5/02* (2013.01)

(58) Field of Classification Search
CPC .......... A62C 5/02; A62C 5/027; A62C 25/00; A62C 27/00; A62C 37/36; A62C 99/0036
USPC ...................... 169/13–15, 23, 24, 56, 60, 61
See application file for complete search history.

(56) References Cited

U.S. PATENT DOCUMENTS

| | | |
|---|---|---|
| 4,224,826 A | 9/1980 | McLoughlin |
| 4,246,969 A | 1/1981 | McLoughlin |

(Continued)

*Primary Examiner* — Darren W Gorman
(74) *Attorney, Agent, or Firm* — Wei Wei Jeang; Grable Martin Fulton PLLC (57) ABSTRACT

A control system comprises a central controller adapted to receive user input and commands, and in communication with a plurality of remote sensors adapted to detect various vehicular parameters: water pressure, water level, water flow rate, engine speed, pump speed, etc., and firefighter parameters: air tank level, air flow rate, body temperature, respiration rate, $O_2$ saturation level, ambient temperature, and presence of hazardous chemicals and radiation. The system further comprises a plurality of remote actuators adapted to receive commands from the central controller and automatically carry out an operation in response to the received command. A wireless communication subsystem is adapted to receive and transmit sensed parameters from the plurality of remote sensors to the central controller, and transmit user input and commands from the central controller to the plurality of remote actuators. A central display screen is adapted to present sensed parameters and warnings.

10 Claims, 4 Drawing Sheets

Related U.S. Application Data (60) Provisional application No. 61/648,404, filed on May 17, 2012.

(56) References Cited

U.S. PATENT DOCUMENTS

| | | |
|---|---|---|
| 4,262,287 A | 4/1981 | McLoughlin |
| 4,324,294 A | 4/1982 | McLoughlin |
| 4,886,282 A | 12/1989 | Wilkinson |
| 5,447,203 A | 9/1995 | McLoughlin |
| 5,590,719 A | 1/1997 | McLoughlin |
| 5,888,051 A | 3/1999 | McLoughlin |
| 5,957,148 A | 9/1999 | Sell |
| 6,082,392 A | 7/2000 | Watkins |
| 6,324,840 B1 | 12/2001 | Watkins |
| 7,040,868 B2 | 5/2006 | McLaughlin |
| 7,055,546 B2 | 6/2006 | McLaughlin |
| 7,156,133 B2 | 1/2007 | McLaughlin |
| 7,161,329 B2 | 1/2007 | McLaughlin |
| 7,849,871 B2 | 12/2010 | McLoughlin |
| 2005/0047921 A1 | 3/2005 | McLaughlin |
| 2005/0061373 A1 | 3/2005 | McLaughlin |
| 2006/0011260 A1 | 1/2006 | McLaughlin |
| 2007/0164127 A1* | 7/2007 | Lozier .............. A62C 31/00 239/71 |
| 2007/0175513 A1 | 8/2007 | McLoughlin |
| 2008/0041599 A1* | 2/2008 | Mulkey ............ A62C 99/009 169/60 |
| 2009/0208346 A1 | 8/2009 | McLoughlin |
| 2009/0260836 A1* | 10/2009 | Laskaris ............ A62C 5/02 169/24 |
| 2010/0012333 A1* | 1/2010 | Fisher ............ F16K 37/0083 169/24 |
| 2011/0061740 A1 | 3/2011 | Watkins |
| 2011/0064591 A1 | 3/2011 | McLoughlin |
| 2011/0232801 A1 | 9/2011 | Watkins |
| 2012/0012344 A1 | 1/2012 | McLoughlin |
| 2012/0061108 A1* | 3/2012 | Cerrano ............ A62C 37/00 169/46 |
| 2013/0008518 A1 | 1/2013 | McLoughlin |

* cited by examiner

COMPLETE INTEGRATED FIREGROUND CONTROL SYSTEM AND METHOD

RELATED APPLICATION

This non-provisional patent application is a continuation-in-part application of U.S. patent application Ser. No. 12/560,398 filed on Sep. 15, 2009 entitled Comprehensive Control System for Mobile Pumping Apparatus, and claims the benefit of provisional patent application Ser. No. 61/648,404 filed on May 17, 2012. Both applications are incorporated herein by reference.

FIELD

The present disclosure relates to the field of firefighting systems and methods, and further to a comprehensive mobile pumping system and method.

BACKGROUND

The difficult and dangerous challenges of firefighting, whether it be a residential fire or a commercial or industrial property fire, are often compounded by a lack of complete and current information about the firefighting equipment, firefighting resources, the fireground, and the status and welfare of the firefighting personnel available to the incident commander and other officers at the fire scene. As many factors and variables such as water pressure, air pressure, temperature, equipment function, etc. affect the overall fast-changing situation of an active fire scene, officers are often forced to make life-and-death decisions on-the-fly without a complete set of relevant and current data.

DETAILED DESCRIPTION

Figure 1:
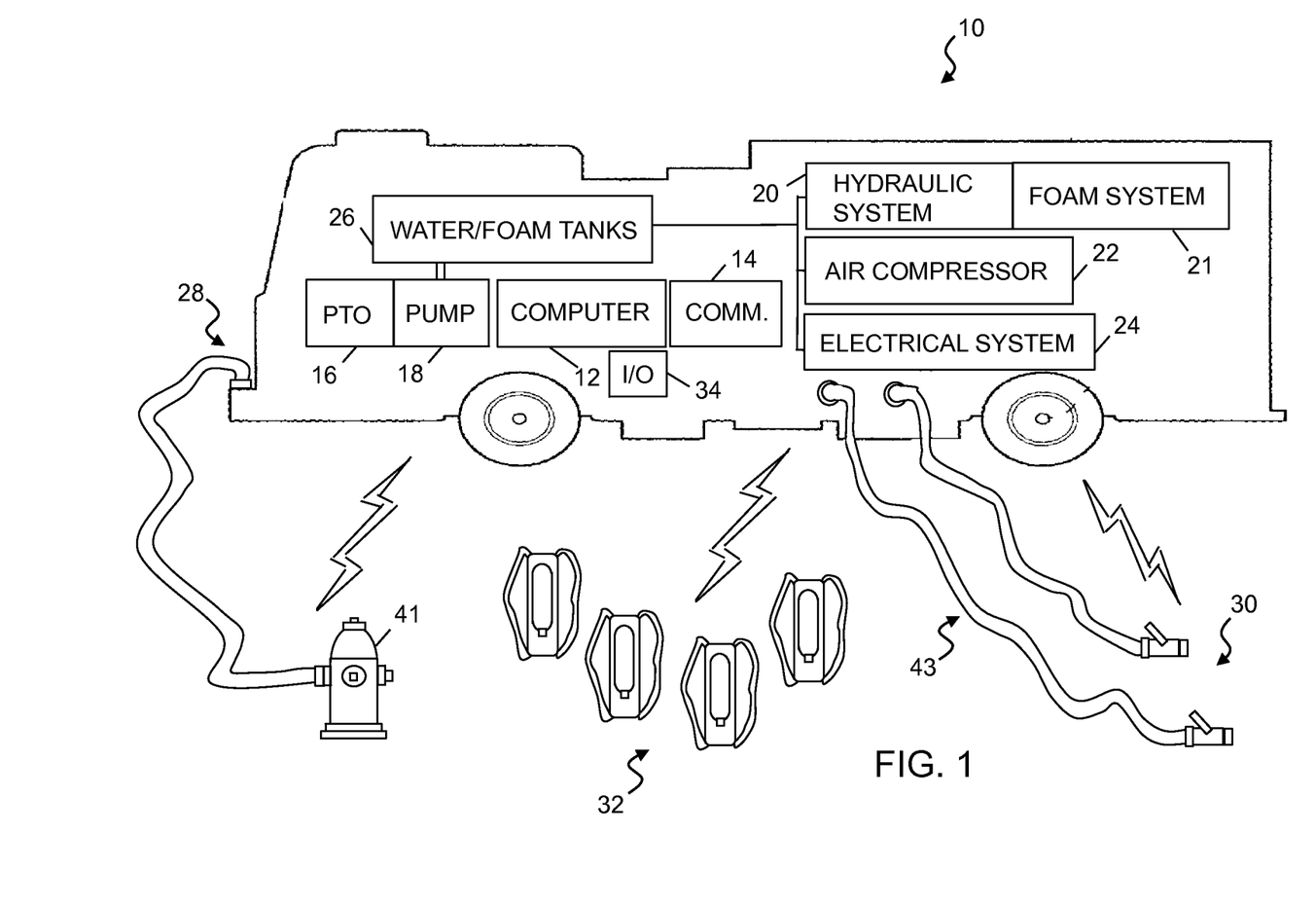
FIG. 1 is a simplified overview diagram of an exemplary embodiment of the complete fireground integrated firefighting system according to the teachings of the present disclosure.

FIG. 1 is a simplified overview diagram of an exemplary embodiment of the complete fireground integrated firefighting system 10 according to the teachings of the present disclosure. The complete fireground integrated firefighting system 10 uses a central control computer system 12 with a wired and/or wireless communications system 14 to receive and monitor various sensor data and measurements to control and regulate equipment operations, including engine (not explicitly shown), engine control module (not explicitly shown), power take-off (PTO) 16, main centrifugal pump 18, pump governor (not explicitly shown), hydraulic subsystem 20, chemical foam subsystem 21, air compressor subsystem 22, and electrical subsystem 24, monitor resources such as water and chemical foam tanks 26, fire hydrant or other supply line pressure 28, fire hose discharge valve pressure 30, and also monitor firefighter physiological data from the firefighters' air packs, helmets, turnout gear, and other equipment 32. The system is operable to automatically react to monitored sensor outputs and other data, regulate all functions of these equipment and devices, including input and discharge water control, electrical and lighting controls, air pressure control, hydraulic system control, and issues warnings and other alerts to firefighting personnel.

This system 10 is also applicable to a bulk fueling situation where a fueling vehicle carrying a fuel tank is used to refuel an aircraft or vehicle. The system 10 uses a central control computer system 12 with a wired and/or wireless communications system 14 to receive and monitor various sensor data and measurements to control and regulate equipment operations, such as engine speed, pump speed, fuel tank level, fuel flow rate, fuel line pressure, temperatures, etc. The system is operable to regulate the fuel flow rate and to open, shut, and regulate various valves to control the flow of fuel and the fueling operation in a safe manner. The central control computer receives and conveys commands and data to and from the remote controllers, remote sensors, and remote actuators to operate the valves and other components of the fueling vehicle in a similar manner described below.

The communications subsystem 14 is able to receive and transmit data and commands to enable the system 10 to monitor and control all of the above functions remotely, record usage and anomalies, and broadcast or transmit alerts and information as required. A user input/output interface (I/O) 34 is provided to receive and display information, and may include a display screen that may be touch-sensitive, one or more buttons, a keyboard, pointing device, warning lights, and other peripheral devices. All alerts and warnings are visually displayed to all on-site personnel and other forms of communication may also be used, such as audio warning alarms, recorded audible messages, and voice synthesis systems.

Figure 2:
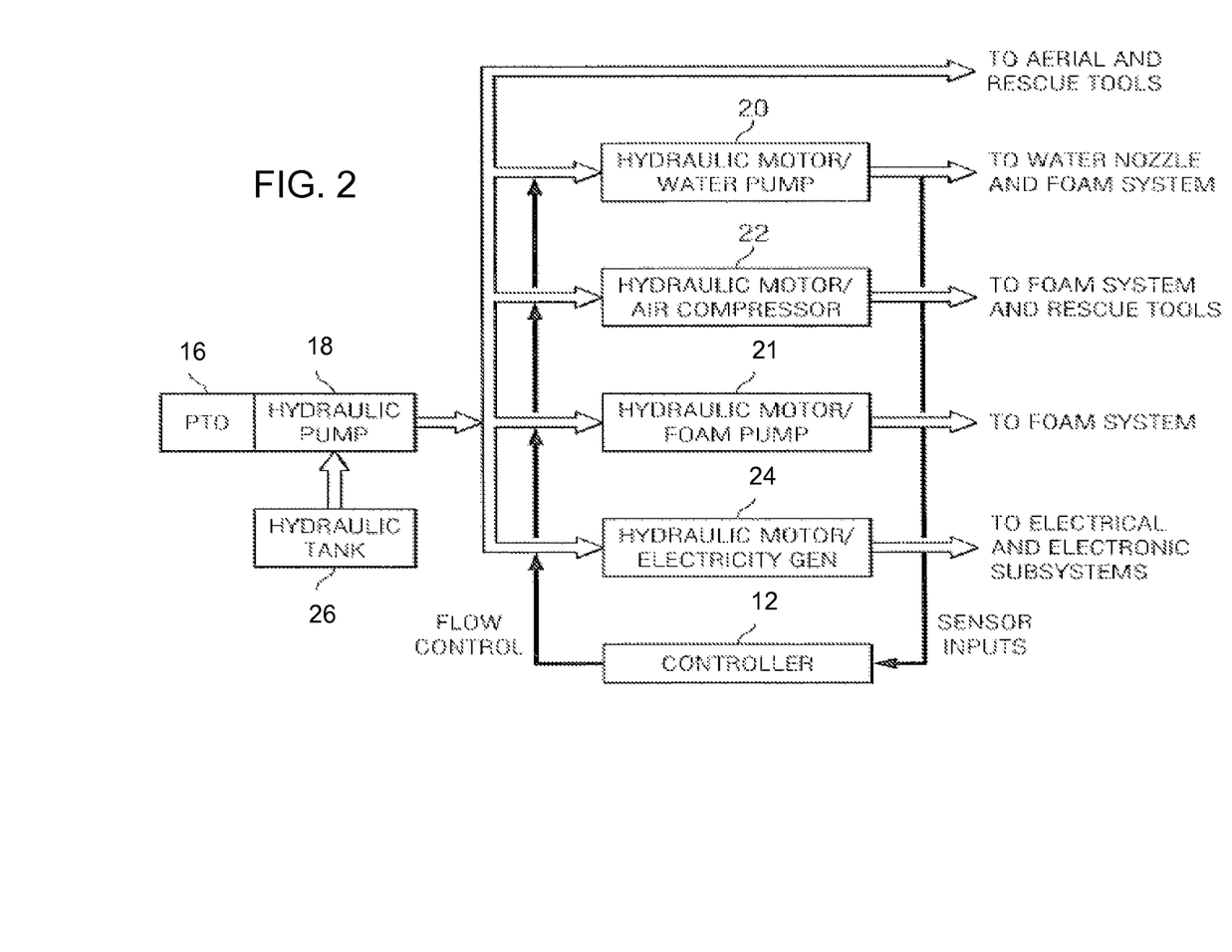
FIG. 2 is a simplified block diagram of a an exemplary embodiment of equipment and resource control subsystem of the complete fireground integrated firefighting system according to the teachings of the present disclosure.

FIG. 2 is a simplified block diagram of a an exemplary embodiment of equipment and resource control subsystem of the complete fireground integrated firefighting system according to the teachings of the present disclosure. The PTO 16 or like equipment is operable to divert engine power from a drive axle of the firefighting apparatus, such as a fire truck, and drive a hydraulic pump 18 in fluid communication with a hydraulic source such as the hydraulic tank 26. The hydraulic pump 16 supplies hydraulic fluid under pressure to a plurality of hydraulic lines leading from the hydraulic pump 14 to several subsystems: water pumping subsystem 20, chemical foam subsystem 21, air compressor subsystem 22, and an electrical power generator subsystem 24. Under the control of a microprocessor-based central control computer system 12, which further monitors the flow rate and pressure of the various outputs from subsystems 20-24, system 10 is capable of delivering electricity, water, air, foam on-demand, as well as sufficient hydraulic pressure to operate an aerial and other rescue tools.

Figure 3:
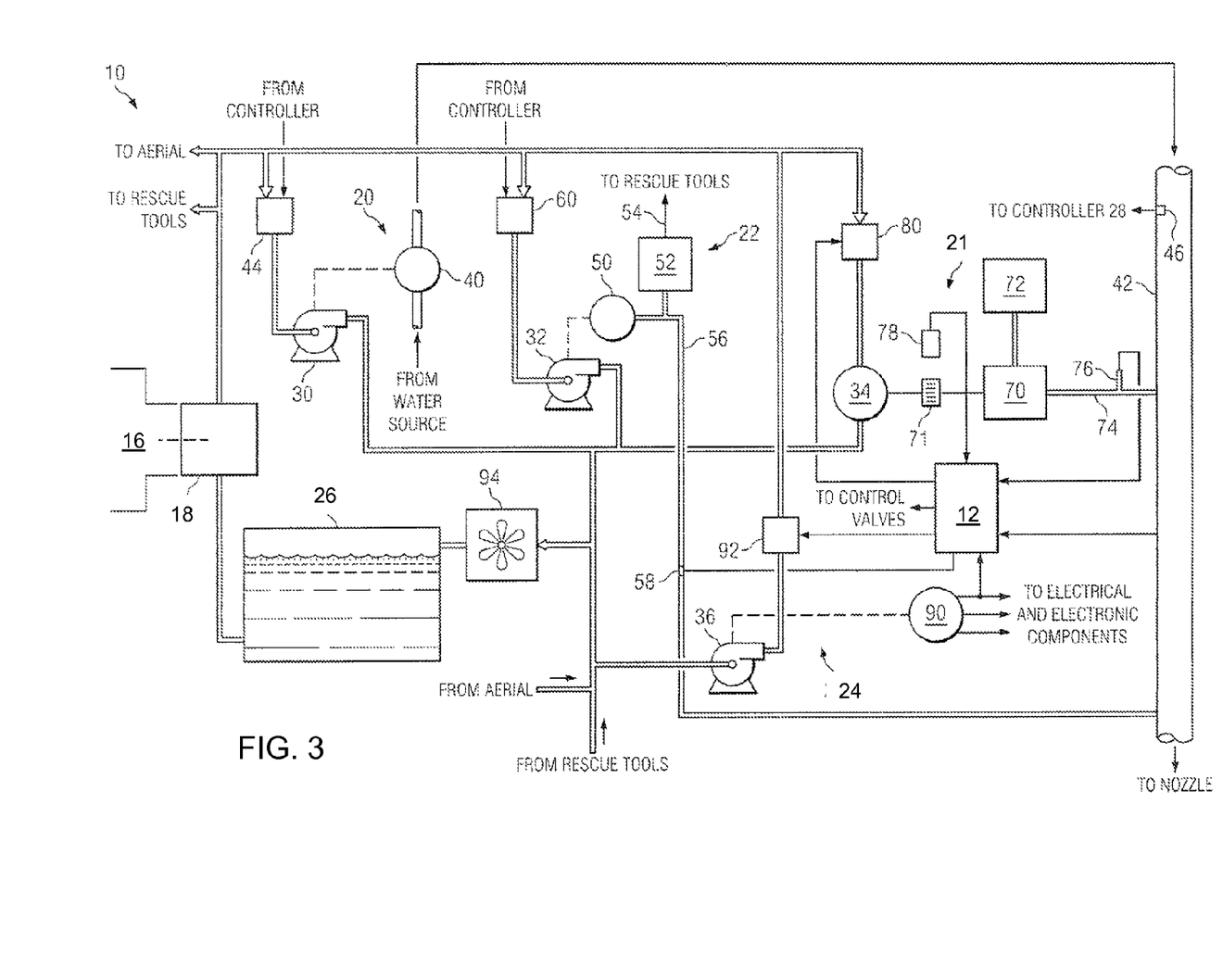
FIG. 3 is a more detailed diagram according to one embodiment of the equipment and resource control subsystem of the complete fireground integrated firefighting system according to the teachings of the present disclosure.

Referring to both FIG. 1 and FIG. 3, the PTO 16 drives the hydraulic pump 18, which draws from a hydraulic source, such as a tank or reservoir 26. The hydraulic pump 18 simultaneously feeds pressurized hydraulic fluid to a plurality of hydraulic motors 30-36 of the water pumping subsystem 20, chemical foam subsystem 21, air compressor subsystem 22, and electrical power generator subsystem 24.

The level of the water in the tank 26 is constantly monitored by a level sensor. In the water pumping subsystem 20, a water pump 40 causes water from a water source, which may be a hydrant 41 or a reservoir (e.g., pool, lake, etc.), to be delivered under pressure to a conduit 42 that may lead to one or more fire hoses 43 or another type of outlet. A control valve 44 receives one or more control signals from the central control computer system 12 to modulate the hydraulic pressure received by the hydraulic pump 30, and thus regulate the water flow rate from the water pump 40. Further, a water flow sensor 46, such as a flow meter, senses the flow rate of the water in the conduit 42 and transmits this data to the central control computer system 12. Using data from water flow sensor 46 as well as controlling hydraulic flow via the control valve 44, the central control computer system 12 is operable to control the speed of the hydraulic motor 44 and the amount of water flow in the conduit 42. One or more additional check valves, ball vales, control valves, relief valves, mixing manifolds and/or other types of devices as known in the art may be included in subsystem 20 but not shown for the sake of clarity. For example, one or more suitable valves may be used to prevent backflow.

In the air compressor subsystem 22, an air compressor 50 is coupled to and driven by the hydraulic motor 32. The air compressor 50 is operable to draw air from an air source, such as an air compressor tank 52, and provide compressed air to an air line 56. The air line 56 is fed into the conduit 42 via an injection device such as an air injection venturi and/or another suitable device. An air flow and pressure sensor 58, such as a transducer and the like, senses and measures the air flow and pressure and transmits this data to the central control computer system 12. A control valve 60 receives one or more control signals from the central control computer system 12 to modulate the hydraulic pressure received by the hydraulic pump 32, and thus control the air flow rate from the air compressor 50. Using data from the air flow and pressure sensor 58 as well as controlling hydraulic flow using control valve 60, the central control computer system 12 is operable to control the speed of the hydraulic motor 32 and the amount of air pressure and air flow in the air line 56. Additionally, compressed air may be used to power certain rescue tools via an air outlet 54 from the air compressor tank 52. The compressed air may also be used to resuscitate firefighters or others overcome by smoke inhalation. One or more additional check valves, ball vales, relief valves, flow valves, control valves, relief valves, mixing manifolds and/or other types of devices as known in the art may be included in subsystem 22 but not shown for the sake of clarity.

In the chemical foam subsystem 21, a foam pump 70 is coupled to and driven by the hydraulic motor 34 via a gear wheel 71. The foam pump 70 is operable to draw a chemical foam from a source, such as a foam reservoir 72, and convey the foam to a conduit 74 coupled to the conduit 42 to inject foam into the conduit 42. The foam pump 70 may be any suitable pump such as a positive displacement pump. The amount of foam injected into conduit 42 may be determined by at least one of two ways. One, a foam flow sensor 76 senses the flow rate of the foam in the conduit 74 and transmits this data to the central control computer system 12. Second, a speed sensor 78 senses the rate at which the gear wheel 71 spins, and also transmits this data to the central control computer system 12. One or both of these foam flow rate sensing ways in addition to other suitable ways may be employed. A control valve 80 receives one or more control signals from the central control computer system 12 to modulate the hydraulic pressure received by the hydraulic pump 34. Using data from the speed sensor 78 and the flow sensor 76 as well as controlling hydraulic flow using the control valve 80, the central control computer system 12 is operable to control the speed of the hydraulic motor 34 and the amount of foam being injected into the conduit 42. As well known in the art, Class A foam suitable for fighting wildfires and structural fires and/or Class B foam suitable for extinguishing flammable liquid fires may be used with chemical foam subsystem 21. One or more additional check valves, ball vales, control valves, relief valves, mixing manifolds and/or other types of devices as known in the art may be included in subsystem 21 but not shown for the sake of clarity. For example, one or more suitable valves may be included to prevent backflow.

In the electricity generation subsystem 24, a generator 90 driven by the hydraulic motor 36 generates and supplies AC and/or DC electrical power to the electrical and electronic components, such as the central control computer system 12, engine controllers and governors, sensors, instruments, displays, user interface, climate control, lighting, communications, and other system components. A control valve 92 receives one or more control signals from the central control computer system 12 to modulate the hydraulic pressure received by the hydraulic pump 36 and its speed. The subsystem 24 runs completely independently and the speed of generator 90 determines the frequency and voltage generated. The central control computer system 12 is operable to monitor the electrical output of generator 90 and regulate the hydraulic pressure at the hydraulic pump 36.

In addition to providing hydraulic pressure to drive water pumping subsystem 20, air compressor subsystem 22, chemical foam subsystem 21, and electrical power generator subsystem 24, the hydraulic pump 18 driven by the PTO 16 further supplies hydraulic fluid to drive the aerial apparatus and rescue tools (not shown) commonly equipped on a firefighting vehicle. The rescue tools commonly used by firefighters include cutters, spreaders, rams, and like equipment used to extricate victims trapped in automobiles or other structures. Hydraulic fluid is returned from the aerial, rescue tools, and the hydraulic motors to a hydraulic cooling subsystem 94, which may include a fan and/or other cooling components as well known in the art. The cooled hydraulic fluid is then returned and stored in hydraulic reservoir 26.

In operation, the engine (not shown) runs at a preselected constant rpm by a governor (not shown) as well known in the art. The engine speed may range from idle to full speed. The speed of the engine and the gear ratios of PTO 16 are selected so that the hydraulic pump 18 may provide maximum flow of hydraulic fluid required at peak demand. It is well known in the art that more than one hydraulic pump may be piggybacked to provide sufficient hydraulic pressure and is therefore contemplated herein for certain applications. The PTO 16 drives the hydraulic pump 18 and supplies hydraulic fluid to the water pumping subsystem 20, air compressor subsystem 22, chemical foam subsystem 21, and electrical power generator subsystem 24. The hydraulic pressure of the hydraulic fluid is under the control of the central control computer system 12, which monitors the water flow rate, foam flow rate, and air pressure from sensors 46, 58, and 76, respectively.

In addition to controlling the hydraulic, air, foam, and electrical subsystems referenced above, the complete integrated control system 10 enables each firefighter to control and monitor various devices that he/she is carrying, wearing, or operating. For example, a firefighter, if he/she has a hose line or hydraulic system, etc., is able to control his/her section of the apparatus via radio communications, i.e. the firefighter is able to open, close, or adjust the valve on the apparatus that is feeding his/her hose line. The firefighter can also request more or less water and/or chemical additives, such as foam or penetrating agents, etc., if so required. If the firefighter requests more water on the hose line, the central control computer system 12 checks the incoming pressure, foam/water tank level, as well as the discharge pressure and simultaneously, if the water source is capable, increase the pressure on the pump by increasing the speed of the engine while simultaneously adjusting all other valves controlled by other firefighters so that they will maintain their original requested flow and pressure. If additional water is not available, i.e. low hydrant pressure, etc., the firefighter who requested additional water is notified via voice alert or information provided on a display.

Various devices worn or carried by the firefighters are also connected by radio signal to the central control computer system 12 so that the system may monitor his/her air pack, environmental parameters, and physiological data. For example, the central control computer system 12 may receive data related to the air pressure in the air pack (indicative of amount of air remaining), air flow (indicative of usage rate), body temperature (to monitor for dangerous overheating), respiration rate, $O_2$ saturation levels, environmental indicators, which are transmitted back to the control computer 10 and recorded or logged. In one embodiment, the firefighters' locations may be monitored and graphically displayed using Global Position System (GPS) and/or other positioning systems. All anomalies in these data (such as exceeding preset thresholds) would trigger a warning or alert that is sounded, displayed or otherwise conveyed to the incidence commander and fed back to the firefighter. The central control computer system 12 also monitors the pass alarm and mayday signal from the firefighters. Therefore, the firefighters are able to control all sources that are feeding the firefighter, i.e. water, foam, hydraulics, air, etc. and the firefighter in turn is monitored for all physical conditions that the firefighter is facing, including environmental factors such as ambient temperature, chemical hazards, radiation readings, and the like.

Figure 4:
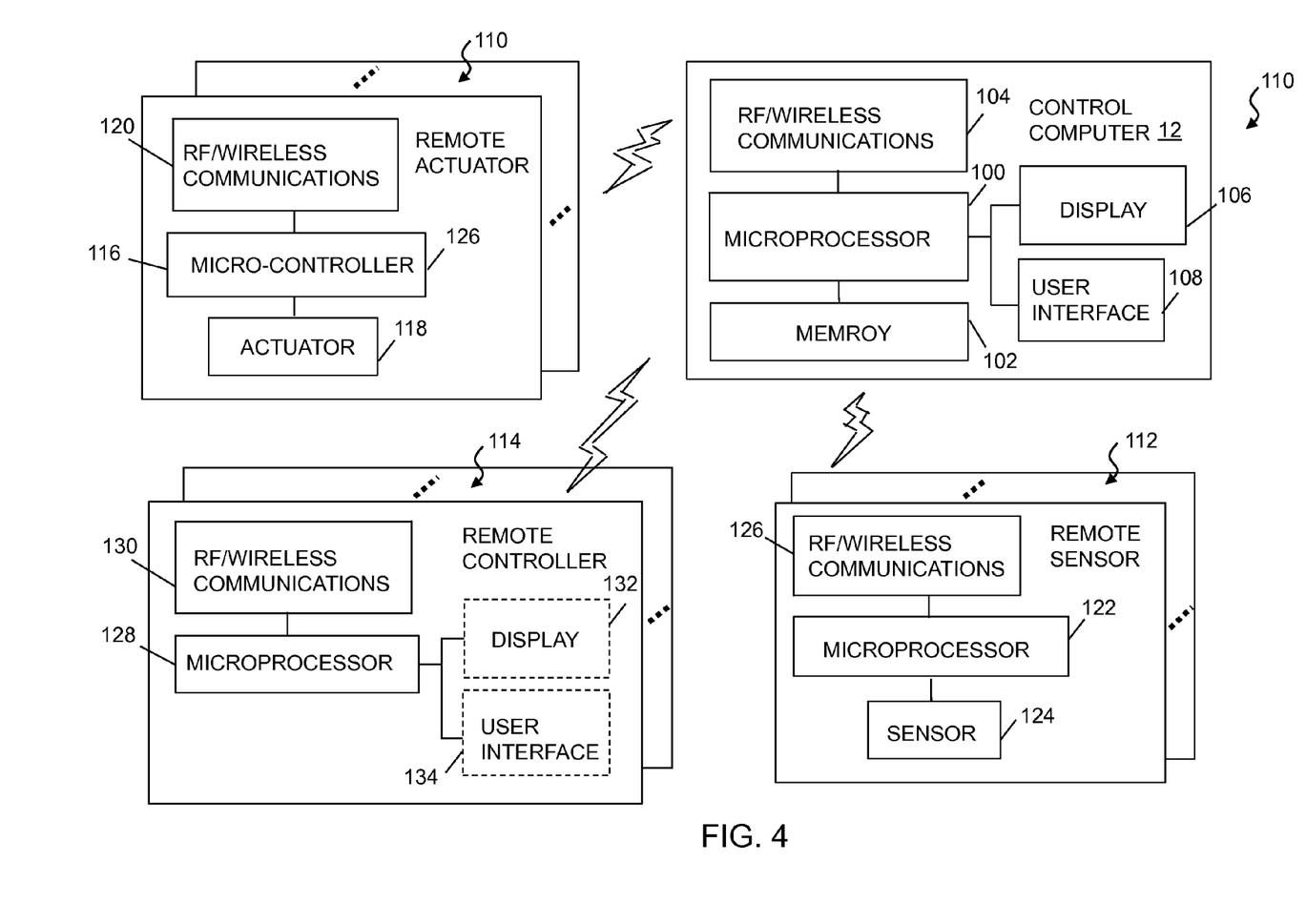
FIG. 4 is a simplified block diagram of a an exemplary embodiment of the complete fireground integrated firefighting system according to the teachings of the present disclosure.

FIG. 4 is a simplified block diagram of a an exemplary embodiment of the complete fireground integrated firefighting system 10 according to the teachings of the present disclosure. The central control computer system 12 includes a microprocessor 100 coupled to a memory 102 and a radio frequency (RF) or wireless communications subsystem 104. The memory may include any number of suitable volatile and/or non-volatile memory or data storage devices, such as random access memory (RAM), read-only memory (ROM), programmable ROM (PROM), Electrically Erasable PROM (EEPROM), dynamic RAM (DRAM), static RAM (SRAM), etc. The RF/wireless communications subsystem 104 may include transceivers or transmitter/receiver devices that are operable to convey data using a communication protocol over some frequency range of RF. Alternatively, other forms of energy, such as acoustic, light, etc. may be used as the communication medium. The microprocessor 100 is further coupled to a display 106 and user interface devices 108. The display 106 may include a display screen that may be touch-sensitive and incorporates graphical user interface (GUI) devices such as windows, menus, drop-down boxes, buttons, softkeys, etc. The user interface devices 108 may further include other forms of visual presentation of data, such as lights, meters, instrument panels, etc. The user may also provide input by using a keyboard, touch-sensitive screen, pointing device (e.g., mouse), buttons, knobs, dials, etc.

The microprocessor 100 is operable to load into its memory a plurality of computer software code or instructions, and execute the code or instructions to carry out the logical operations of receiving sensor data, process the sensor data, comparing the sensor data to preset thresholds, receive command input, and automatically act on the received data, including sending control commands to regulate operational parameters such as valve position, pump speed, etc. The microprocessor 100 may further trigger, transmit, and convey alarms or alerts when certain received sensor data exceeds thresholds that warrant immediate human intervention or response.

The RF/wireless communication subsystem 104 of the central control computer system 12 is operable to communicate, preferably via wireless communications, with a plurality of remote actuators 110, sensors 112, and controllers 114.

The remote actuator 110 preferably include a micro-controller 116, an actuator, driver, or switch 118, and RF/wireless communications devices 120. The remote actuator 110 is operable to communicate, wirelessly or wired, with the central control computer system 12 and can be controlled to perform certain function by commands or instructions issued from the central control computer system 12. For example, a remote actuator 110 may be used to control the operations of a discharge valve that regulate the water flow to one or more fire hoses, another remote actuator 110 may be used to operate a flow valve to regulate the flow of air or gas in a conduit, and yet another remote actuator 110 may be used to control the operation of a pump supplying hydraulic fluid to drive the aerial apparatus and rescue tools equipped on a firefighting vehicle.

The remote sensors 112 are also in wireless communication with the central control computer system 12. The remote sensor 112 preferably include a micro-controller 122, a sensor, transducer, or meter 124, and RF/wireless communications devices 126. The remote sensors 112 are deployed in the system 10 to measure or detect a plurality of different conditions: engine speed, pump speed, intake pressure, fluid pressures, discharge pressure, temperature, flow rate, quantity, level, and the presence of certain elements (e.g., chemicals or radiation). It is possible for the remote sensors 112 to be in wired and/or wireless communications with remote controllers 114 and/or remote actuators 110. For example, all the sensors on a firefighter's gear and helmet may be in wired and/or wireless communication with a local micro-controller 128 of a remote controller 114 that is operable to receive the sensor data, monitor for anomalies, communicate with the central control computer system 12 (such as transmit sensor data and firefighter status, and receive commands), and give the firefighter local audible and/or visual feedback and receive local input. The remote controller 114 preferably include a micro-controller 128, RF/wireless communications devices 130, display 132, and user interface 134. In one embodiment, the display 132 and user interface 134 provide a visual presentation of current status/data, and alert or warning issue by the command post. The firefighter may manually control or issue commands to control the valves that regulate the water flow in the fire hose and nozzle. In one embodiment, the firefighter's helmet includes a microphone and a speaker that enable the firefighter to hear audible warnings and alerts, and to issue voice communication that are received by the micro-controller 128, which may be relayed to the central control computer system 12 via the wireless communication subsystem. Alternatively, the voice communication paths between the command post and firefighters may be implemented by a separate RF communication system as known in the art. In a further embodiment, the firefighters may each wear a GPS device and/or another type of transponder or transceiver system operable to determine the position of each firefighter using triangulation or multilateration techniques as known in the art. The position of each firefighter is continually relayed to the central control computer system 12 and graphically displayed on the monitor screen at the command post.

Accordingly, the central control computer system is adapted to monitor all discharge lines continuously. It determines pressure and flow rates using mathematical formulas as known in the art and compares the data to preset thresholds stored in memory. If the flow rate is too high, the central control computer system may generate and transmit a warning to the nozzle person, such as first line. If the water flow is too low at a certain pressure, the central control computer system may also generate and transmit a warning indicating a kinked line or modify nozzle setting or both. All of the aforementioned sensor and operational data are stored in memory or another type of data storage device, and the system reports immediately when any function or component is not working properly or requires service, or periodic maintenance, such as filter change, oil change, etc. Immediate notification are issued for all hazardous situations, including but not limited to radiation, poisonous gasses, excess area temperature, low or malfunctioning air supply, and anomalies in the firefighters' physiological data. These parameters are monitored by appropriate sensors and transducers which communicate with the firefighter's personal or local computer for analysis, and initiating warnings if necessary, as well as transmitting all pertinent information to the central control computer system 12 or other firefighters. All firefighters will have voice communication capabilities with the command post, and other firefighters.

An alternate application of the central control computer system 12 is the bulk fueling application such as fueling large aircraft or vehicles. A central control computer system installed on a mobile platform such as a fueling tanker is used for these applications. The operator may enter, via a user interface, the number of gallons of fuel that should be transferred from the fueling tanker to the vehicle or aircraft. The central control computer may have access to stored data, logic, and mathematical equations related to the fueling operation that specify parameters such as the desired fuel flow rate, engine speed, pump speed, back pressure, etc. and the desired relationship between such data points. The central control computer is operable to receive, via wireless communication, fuel tank level, engine speed, pump speed, fuel flow rate, back pressure in the fuel line, and the level of the fuel tank in the aircraft or vehicle from various remote sensors. The central control computer is operable to regulate the engine speed, pump speed, fuel flow rate, and to shut off fuel flow (by shutting of one or more valves in the fuel line) when the fuel tank in the craft reaches a predetermined desired level. For example, the central control computer receives the back pressure measured in the fuel line and may adjust the pump speed, engine speed, and/or the setting of one or more valves in the fuel line in response to the back pressure. As described above, wired and wireless communication may be used to convey the sensor data and commands between the control computer and the various remote sensors and actuators. The fueling operator may provide input to the control computer via one or more forms of user input/output interface, such as keyboard, menus, pointing device, touch-sensitive screen, etc. and monitor fueling progress by viewing various data related to the fueling operation displayed on a monitor.

The features of the present invention which are believed to be novel are set forth below with particularity in the appended claims. However, modifications, variations, and changes to the exemplary embodiments described above will be apparent to those skilled in the art, and the system and method described herein thus encompass such modifications, variations, and changes and are not limited to the specific embodiments described herein.

What is claimed is:

1. A complete fireground control system for a firefighting vehicle having a hydraulic subsystem driven by an engine and incorporating a hydraulic pump configured to deliver pressurized hydraulic fluids to a plurality of hydraulic motors using hydraulic power to drive a plurality of subsystems of the vehicle and an aerial apparatus, the system, comprising:
   at least one central controller configured to receive user input and commands;
   a plurality of remote sensors configured to detect and transmit sensed parameters to the central controller, the sensed parameters including vehicular parameters selected from: engine speed, hydraulic pressure, water pressure, water level, water flow rate, foam level, foam flow rate, air pressure, air flow rate, engine parameters, pump speed, and firefighter parameters selected from: air tank level, air flow rate, position, body temperature, respiration rate, $O_2$ saturation level, ambient temperature, and presence of hazardous chemicals and radiation;
   a plurality of remote actuators configured to receive commands from the at least one central controller, the commands being generated by the at least one central controller in a coordinated response to the received sensed parameters and user input and commands, and the plurality of remote actuators configured to automatically carry out an operation in response to the received commands;
   a wireless communication subsystem communicatively coupled to the at least one central controller and configured to receive and transmit the sensed parameters from the plurality of remote sensors to the at least one central controller, and transmit user input and commands from the at least one central controller to the plurality of remote actuators; and
   a central user interface communicatively coupled to the at least one central controller and configured to present sensed parameters and warnings to an operator.

2. The system of claim 1, further comprising a plurality of remote controllers configured to communicate with the at least one central controller, receive user input, and control a plurality of firefighting operations.

3. The system of claim 1, wherein the at least one central controller is configured to receive the sensed parameters, compare to predetermined thresholds, and issue at least one of audio and visual warning alerts in response to the sensed parameters exceeding the predetermined thresholds.

4. The system of claim 1, wherein the at least one central controller is communicatively coupled to a remote user interface configured to receive user input.

5. The system of claim 1, wherein the at least one central controller is configured to remotely control engine speed, pump speed, and valve settings to automatically regulate at least one of water flow rate, air flow rate, and foam flow rate.

6. The system of claim 1, wherein the at least one central controller is configured to remotely control engine speed and hydraulic pump speed to automatically control an electrical generation subsystem.

7. The system of claim 1, wherein the at least one central controller is configured to receive a nozzle discharge flow rate, and issue a warning alert in response to the discharge flow rate being one of above a first predetermined threshold or below a second predetermined threshold.

8. The system of claim 1, wherein the at least one central controller is configured to receive a nozzle discharge flow rate, and remotely control at least one of engine speed, pump speed, and valve settings to automatically regulate the discharge flow rate to fall within a predetermined range.

9. The system of claim 1, wherein the at least one central controller is configured to receive position information for each active firefighter, and display the position information on the central user interface.

10. A complete fireground control system for a firefighting vehicle, the system comprising:
- a plurality of remote sensors configured to detect a plurality of sensed parameters including vehicular parameters selected from: hydraulic pressure, water pressure, water level, water flow rate, foam level, foam flow rate, air pressure, air flow rate, engine parameters, pump speed, and firefighter parameters selected from: air tank level, air flow rate, position, body temperature, respiration rate, $O_2$ saturation level, ambient temperature, and presence of hazardous chemicals and radiation;
- a wireless communication subsystem communicatively coupled to the plurality of remote sensors;
- at least one central controller communicatively coupled to the wireless communication subsystem and configured to receive user input and the plurality of sensed parameters from the plurality of remote sensors, the at least one central controller configured to automatically compare at least one of the received plurality of sensed parameters to at least one predetermined threshold, analyze user input, and automatically operate and control vehicle operations in a coordinated response to the received plurality of sensed parameters and user input; and
- a central user interface communicatively coupled to the at least one central controller and configured to receive user input and present the sensed parameters and warnings.

* * * * *